(12) United States Patent
Kong et al.

(10) Patent No.: US 10,234,660 B2
(45) Date of Patent: Mar. 19, 2019

(54) OPTICAL LENS ACCESSORY FOR PANORAMIC PHOTOGRAPHY

(71) Applicant: JRD COMMUNICATION (SHENZHEN) LTD., Shenzhen, Guangdong (CN)

(72) Inventors: Mei Kong, Shenzhen (CN); Zhe Liu, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 14 days.

(21) Appl. No.: 15/542,640

(22) PCT Filed: Sep. 29, 2016

(86) PCT No.: PCT/CN2016/100743
§ 371 (c)(1),
(2) Date: Jul. 10, 2017

(87) PCT Pub. No.: WO2017/161850
PCT Pub. Date: Sep. 28, 2017

(65) Prior Publication Data
US 2018/0045924 A1 Feb. 15, 2018

(30) Foreign Application Priority Data
Mar. 23, 2016 (CN) .......................... 2016 1 0173096

(51) Int. Cl.
*G02B 13/06* (2006.01)
*H04N 5/225* (2006.01)
(Continued)

(52) U.S. Cl.
CPC ........... *G02B 13/06* (2013.01); *H04N 5/2254* (2013.01); *H04N 5/2257* (2013.01);
(Continued)

(58) Field of Classification Search
CPC .... G02B 13/06; G02B 13/005; H04N 5/2254; H04N 5/2257; H04N 5/23238; H04N 5/247
See application file for complete search history.

(56) References Cited

U.S. PATENT DOCUMENTS 2,923,220 A * 2/1960 Bouwers ................ G03B 37/00
359/725
2,926,561 A * 3/1960 Keeble ................... G03B 37/00
352/69
(Continued)

FOREIGN PATENT DOCUMENTS

CN 101969541 A 2/2011
CN 105049569 A * 11/2015
(Continued)

*Primary Examiner* — William R Alexander
*Assistant Examiner* — Tamara Y. Washington

(57) ABSTRACT

An optical lens accessory used in conjunction with a terminal device equipped with two camera devices is provided, the optical lens accessory includes: an optical device including two fisheye lenses arranged in a back-to-back configuration, where directions of the two respective viewing angles associated with the two fisheye lenses are opposite to each other, and where viewing angle of each of the fisheye lenses is greater than 180° to allow each of the two fisheye lenses to independently frame a view in the respective direction of the respective viewing angle, to let the framed lights into the two camera devices; a housing device positioned outside the optical device, where the housing device is configured to support the optical device, and to isolate the framed lights from external stray light; and a fixture device configured to attach the optical lens accessory to the terminal device.

16 Claims, 2 Drawing Sheets

(51) Int. Cl.
    *H04N 5/232*       (2006.01)
    *H04N 5/247*       (2006.01)
    *G02B 13/00*       (2006.01)
(52) U.S. Cl.
    CPC ........ *H04N 5/23238* (2013.01); *H04N 5/247* (2013.01); *G02B 13/005* (2013.01)

(56) References Cited

U.S. PATENT DOCUMENTS

| | | | | |
|---|---|---|---|---|
| 2,972,281 A * | 2/1961 | Dresser | | G03B 37/00 352/69 |
| 3,063,334 A * | 11/1962 | Smith | | G03B 37/00 353/120 |
| 3,144,806 A * | 8/1964 | Smith | | G03B 37/00 352/70 |
| 3,379,489 A * | 4/1968 | Ratliff, Jr. | | G03B 31/02 352/38 |
| 3,504,964 A * | 4/1970 | Persidsky | | G03B 37/00 352/105 |
| 5,477,303 A * | 12/1995 | Goto | | G02B 7/38 396/114 |
| 5,721,585 A * | 2/1998 | Keast | | G02B 13/06 348/36 |
| 6,111,511 A * | 8/2000 | Sivathanu | | G08B 17/12 250/336.1 |
| 6,552,713 B1 * | 4/2003 | Van Brocklin | | G06F 1/1616 345/156 |
| 6,646,818 B2 * | 11/2003 | Doi | | G02B 13/06 359/725 |
| 6,654,171 B1 * | 11/2003 | Hampel-Vogedes | | H04N 5/74 348/E5.137 |
| 8,910,871 B1 * | 12/2014 | Powell | | G06K 7/10722 235/462.07 |
| 9,398,271 B2 * | 7/2016 | Jeon | | H04N 5/2259 |
| 2005/0036187 A1 * | 2/2005 | Sugawara | | G02B 26/101 359/202.1 |
| 2006/0266917 A1 * | 11/2006 | Baldis | | H01Q 1/248 250/200 |
| 2007/0159607 A1 * | 7/2007 | Nishigaki | | G02B 13/06 353/94 |
| 2007/0182812 A1 * | 8/2007 | Ritchey | | H04N 5/2254 348/36 |
| 2008/0192258 A1 * | 8/2008 | Wadman | | G01N 21/274 356/446 |
| 2008/0247061 A1 * | 10/2008 | Simkulet | | G02B 13/06 359/730 |
| 2009/0225443 A1 * | 9/2009 | Toyoda | | H04N 5/3415 359/737 |
| 2010/0045773 A1 * | 2/2010 | Ritchey | | G02B 13/06 348/36 |
| 2014/0218468 A1 * | 8/2014 | Gao | | H04N 5/2258 348/36 |
| 2018/0052308 A1 * | 2/2018 | Kong | | G03B 17/14 |
| 2018/0255288 A1 * | 9/2018 | Cole | | H04N 13/161 |
| 2018/0262745 A1 * | 9/2018 | Cole | | H04N 13/183 |

FOREIGN PATENT DOCUMENTS

| | | |
|---|---|---|
| CN | 105049569 A | 11/2015 |
| CN | 105120177 A | 12/2015 |
| CN | 205051781 U | 2/2016 |
| CN | 105376471 A | 3/2016 |
| CN | 105979246 A | 9/2016 |

* cited by examiner

OPTICAL LENS ACCESSORY FOR PANORAMIC PHOTOGRAPHY

TECHNICAL FIELD

This disclosure relates generally to the field of photography, and more particularly, to an optical lens accessory for panoramic photography.

BACKGROUND

A panorama is a kind of wide-angle images. Panorama is expressed through a wide-angle view, as well as in the form of painting, photo, video, and 3D model etc., so as to display the surrounding environment as much as possible. A 360-degree panorama is achieved by capturing image information of an entire scene by a professional camera, or using images rendered by a modeling software; stitching the images by an image stitching software, and finally playing the 360-degree panorama on a specific player. That is to transform a two-dimensional image or an image rendered by computer modeling into a 360-degree panoramic view for a virtual reality view. The two-dimensional image may be simulated as a real three-dimensional space and presented to a viewer.

Currently, specialized image capturing devices are often required to capture a wide-angle image or a panorama, and the specialized image capturing devices are usually expensive. For example, when capturing a spherical panorama, an integrated capturing device is mainly used. The integrated capturing device may include one or more optical lenses, optical image sensors, motion detection sensors, image processing units, image storage modules, physical buttons, and displays for output, rechargeable batteries, and wired or wireless connection modules that communicate with other devices. The price of such products may be too expensive that users may not afford.

SUMMARY

A principal technical problem to be addressed by the disclosure is to provide an optical lens accessory for panoramic photography, which can rapidly and easily meet the needs for panoramic image capturing, thereby greatly reducing costs for users, and improving user experience.

To address the technical problem above, according to an aspect of the disclosure, an optical lens accessory for panoramic photography is disclosed. The optical lens accessory is used in conjunction with a terminal device equipped with both a front camera device and a rear camera device, the optical lens accessory comprising: an optical device comprised of two fisheye lenses arranged in a back-to-back configuration, wherein the directions of the two respective viewing angles associated with the two fisheye lenses are opposite to each other, and wherein the viewing angle of each of the fisheye lenses is greater than 180° to allow each of the two fisheye lenses to independently frame a view in the respective direction of the respective viewing angle, wherein the optical device is configured to let the framed lights into the two camera devices, and wherein the centers of the two fisheye lenses and the centers of the two camera devices are on a same axis; two lenses respectively positioned in two optical paths through which the two framed lights entering the two camera devices, wherein the two lenses are configured to move back and forth along the axial directions thereof to adjust a respective distance between each of the two lenses and a respective camera device of the two camera devices so as to merge the two framed lights, thereby causing the two framed lights to both enter the two camera devices; a housing device positioned outside the optical device and causing no interference to the ranges of viewing angles of the two fisheye lenses, wherein the housing device is configured to support the optical device, and to isolate the framed lights from external stray light, thereby preventing the external stray light from interfering with the two optical paths of the two framed lights; and a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography, wherein during the cooperative use of the optical lens accessory with the two camera devices, the two fisheye lenses are positioned on a front side and a rear side of the two camera devices, respectively.

In some embodiments, the centers of the two fisheye lenses and the centers of the two camera devices are on a same axis.

In some embodiments, a distance between the two fisheye lenses is defined as a first distance, wherein when the optical lens accessory is attached to the adapted terminal device, the first distance is such that an area associated with a portion of the viewing-angle-covered field blocked by the terminal device is minimized.

In some embodiments, a size of the housing device is defined as a first size, wherein when the optical lens accessory is attached to the adapted terminal device, the first size is such that an area associated with a portion of the viewing-angle-covered field blocked by the terminal device is minimized.

To address the technical problem above, according to another aspect of the disclosure, an optical lens accessory for panoramic photography is disclosed. The optical lens accessory is used in conjunction with a terminal device equipped with both a front camera device and a rear camera device, the optical lens accessory comprising: an optical device comprised of two fisheye lenses arranged in a back-to-back configuration, wherein the directions of the two respective viewing angles associated with the two fisheye lenses are opposite to each other, and wherein the viewing angle of each of the fisheye lenses is greater than 180° to allow each of the two fisheye lenses to independently frame a view in the respective direction of the respective viewing angle, wherein the optical device is configured to let the two framed lights into the two camera devices; a housing device positioned outside the optical device and causing no interference to the ranges of viewing angles of the two fisheye lenses, wherein the housing device is configured to support the optical device, and to isolate the two framed lights from external stray light, thereby preventing the external stray light from interfering with the two optical paths of the two framed lights; and a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography, wherein during the cooperative use of the optical lens accessory with the two camera devices, the two fisheye lenses are positioned on a front side and a rear side of the two camera devices, respectively.

In some embodiments, the optical devices further comprises: two lenses respectively positioned in two optical paths through which the two framed lights entering the two camera devices, wherein the two lenses are configured to move back and forth along the axial directions thereof to adjust a respective distance between each of the two lenses and a respective camera device of the two camera devices so as to merge the two framed lights, thereby causing the two framed lights to both enter the two camera devices.

In some embodiments, the centers of the two fisheye lenses and the centers of the two camera devices are on a same axis.

In some embodiments, the centers of the two fisheye lenses and the centers of the two camera devices are on a same axis.

In some embodiments, a distance between the two fisheye lenses is defined as a first distance, wherein when the optical lens accessory is attached to the adapted terminal device, the first distance is such that an area associated with a portion of the viewing-angle-covered field blocked by the terminal device is minimized.

In some embodiments, a size of the housing device is defined as a first size, wherein when the optical lens accessory is attached to the adapted terminal device, the first size is such that an area associated with a portion of the viewing-angle-covered field blocked by the terminal device is minimized.

Advantages of the disclosure may follow. As compared with the prior art, the optical lens accessory of the present disclosure may be used in conjunction with a terminal device equipped with both a front camera device and a rear camera device, the optical lens accessory includes: an optical device comprised of two fisheye lenses arranged in a back-to-back configuration, where the directions of the two respective viewing angles associated with the two fisheye lenses are opposite to each other, and where the viewing angle of each of the fisheye lenses is greater than 180° to allow each of the two fisheye lenses to independently frame a view in the respective direction of the respective viewing angle, where the optical device is configured to let the framed lights into the two camera devices; a housing device positioned outside the optical device and causing no interference to the ranges of viewing angles of the two fisheye lenses, where the housing device is configured to support the optical device, and to isolate the framed lights from external stray light, thereby preventing the external stray light from interfering with the two optical paths of the two framed lights; and a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography. Given that the optical lens accessory is used in conjunction with a terminal device equipped with two camera devices, the optical lens accessory includes a fisheye lens, the fisheye lens is configured to frame a view with a range of viewing angle greater than 180 degrees and let framed light into the camera device. By this configuration, the present technology can rapidly and easily meet the needs for panoramic photography with the terminal device equipped with the camera device, thereby greatly reducing costs for users, and improving user experience.

DETAILED DESCRIPTION

The detailed description set forth below is intended as a description of the subject technology with reference to the appended figures and embodiments.

The present disclosure may be based on a fact that most common mobile terminals, such as smart phones and tablets may include components and modules for capturing wide-angle images or used in panoramic imaging devices. The present disclosure may reuse the existing components and modules of these mobile terminals, and add one or more missing components, for example, including an optical lens accessory to project a wide-angle image or a panoramic image to a camera device on a terminal.

Figure 1:
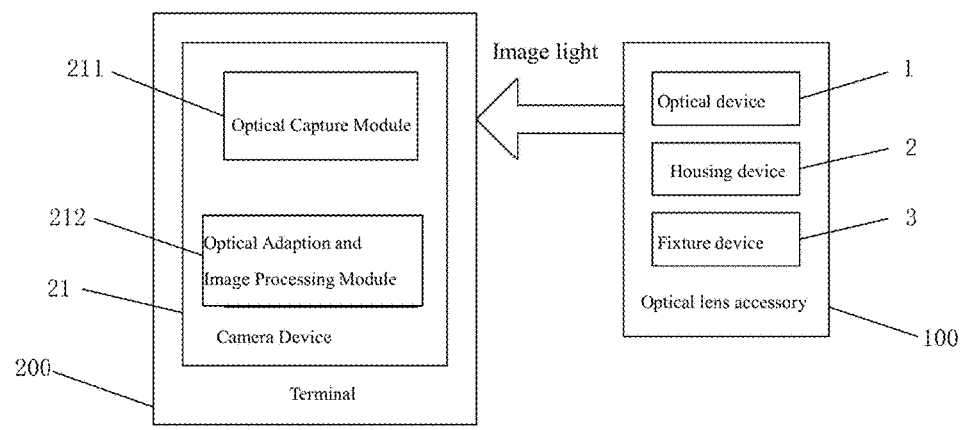
FIG. 1 is a block diagram of an exemplary system based on an optical lens accessory and a terminal device with a camera device according to one embodiment of the present disclosure.

Turning to FIG. 1, a block diagram of an exemplary system based on an optical lens accessory and a terminal device with a camera device according to one embodiment of the present disclosure is shown. The exemplary system includes an optical lens accessory 100 and a terminal device 200 with two camera devices 21 (21a and 21b).

The optical lens accessory 100 may include two fisheye lenses to frame a view with a range of viewing angle greater than 180 degrees and let framed light into the camera devices 21. The optical lens accessory 100 includes an optical device 1, a housing device 2, and a fixture device 3.

The optical device 1 may include two fisheye lenses to frame a view with a range of viewing angle greater than 180 degrees and let framed light into the camera device 21. The housing device 2 may be positioned outside the optical device 1. In some aspects, the housing device 2 may cause no interference to the range of viewing angle of the fisheye lenses. The housing device 2 is configured to support the optical device, and to isolate the framed light from external stray light, thereby preventing the external stray light from interfering with the optical path of the framed light. The fixture device 3 is configured to attach the optical lens accessory 100 to the camera device 21 of the terminal device 200 while causing no interference to the range of viewing angle of the fisheye lenses wide, thereby facilitating a cooperative use of the optical lens accessory 100 with the camera device 21 to perform wide angle-of-view photography.

The camera device 21 of the terminal device 200 may capture image content with a wide-angle view. The camera device 21 may include an optical capture module 211, and an optical adaptation and image processing module 212.

The optical capture module 211 is a part of the terminal device 200, and may generally relate to a camera device (e.g., camera lens and optical image sensor) that processes and records one or more wide-angle images. A display of the terminal may display the one or more wide-angle images. One or more sensors (e.g., Accelerometers and Gyroscopes) may be used to perform calibration to reduce imaging jitters caused by imaging capturing process.

The optical adaptation and image processing module 212 may be related to the following descriptions. As described above, the optical lens accessory 100 may be mounted on the camera device of terminal device 200 to capture one or more images. The camera device of the terminal device 200 may produce one or more images captured by the optical lens accessory 100 through an optical image sensor, and perform image stitching, and image post-processing by a computer software.

The detailed description of the optical lens accessory 100 is as follows.

Figure 2:
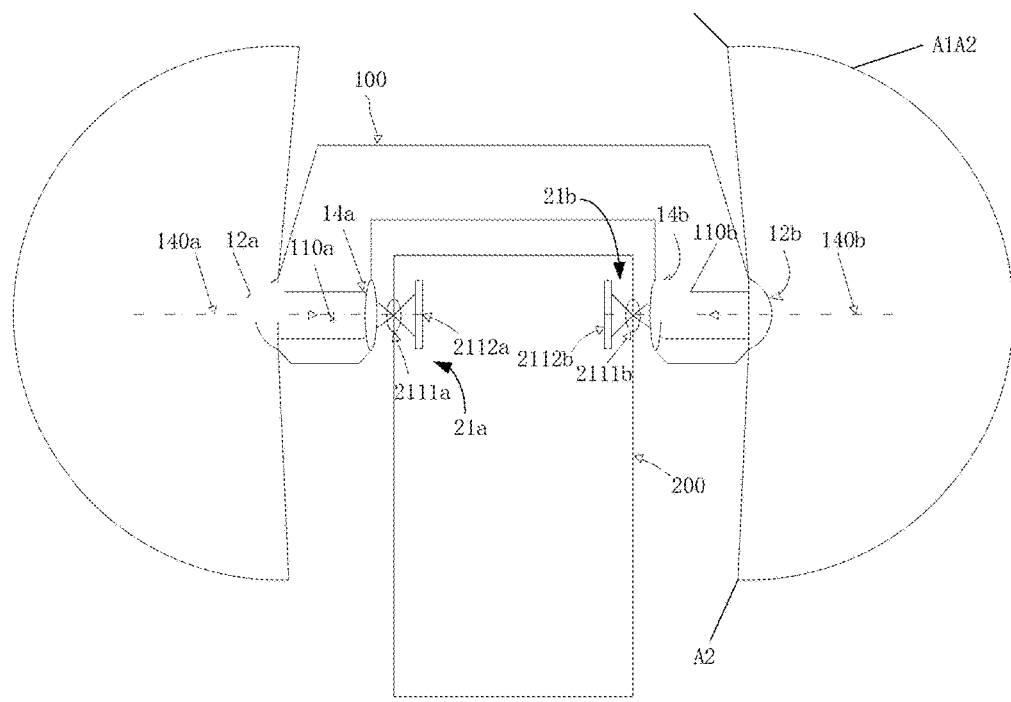
FIG. 2 is a block diagram of an optical lens accessory for panoramic photography according to one embodiment of the present disclosure.

Turning to FIG. 2, the present disclosure provides an optical lens accessory for panoramic photography. The optical lens accessory 100 may be used in conjugation with terminal device 200 equipped with at least one camera device 21. Existing terminal devices equipped with at least one camera device may include smart phones, tablet computers and cameras.

The optical lens accessory 100 may include an optical device, a housing device, and a fixture device.

The optical device may include two fisheye lenses 12 (12a and 12b). The two fisheye lenses 12 may be arranged in a back-to-back configuration, the directions of the two respective viewing angles associated with each of two fisheye lenses 12 are opposite to each other, and the viewing angle of each of two fisheye lenses 12 is greater than 180° to allow each of two fisheye lenses 12 to independently frame light in the respective direction of the respective viewing angle (e.g., arc A1A2 formed by connecting point A1 and point A2 as shown in FIG. 2). The optical device may let framed light 110 (e.g., 110a, 110b) into the camera device 21 (e.g., 21a, 21b).

Certainly, the fisheye lenses 12 may include one or more additional optical lenses to facilitate transmission of one or more optical paths. For example, the framed light 110 coming out of the two fisheye lenses 12 may be parallel to external stray light getting into the two fisheye lenses 12. Subsequently, framed light 110 from the fisheye lenses 12 can be let into the camera device 21 more easily.

The housing device may be positioned outside the optical device and causes no interference to the range of viewing angle of fisheye lenses. The housing device may be configured to support the optical device, and to isolate framed light from external stray light, thereby preventing the external stray light from interfering with the optical path of framed light.

The fixture device may be configured to attach the optical lens accessory to an adapted terminal device while causing no interference to the range of viewing angle of fisheye lenses, thereby facilitating a cooperative use of optical lens accessory with a front camera device and a rear camera device to perform wide angle-of-view photography.

During the cooperative use of the optical lens accessory with the front camera device and the rear camera device, the two fisheye lenses may be positioned on a front side and a rear side of the two camera devices, respectively.

In order to maximize the patency of image with a viewing angle, the housing device of the optical lens accessory 100 may satisfy a design rule that the housing device may cause no interference to the range of viewing angle of the fisheye lenses 12 and be located outside of the range of viewing angle of the fisheye lenses 12. Similarly, the fixture device may satisfy the same design rule.

In addition, the optical lens accessory 100 may be designed in an asymmetrical shape so as to better accommodate the shape of the terminal device.

It is noted that the details of mounting the optical lens accessory 100 onto the terminal device may not be limited herein. The detailed requirements for mounting the optical lens accessory 100 may include fitting the optical lens accessory 100 and the camera device 21 of the terminal device 200 nicely and tightly, generating a very small offset between the central position of the optical lens accessory 100 and the central position of the camera device 21 (e.g., preferably, no offset). Thus, if there is an interactive, compatible structural design between the terminal device 200 (e.g., designed in a convex shape) and the optical lens accessory 100 (e.g., designed in a concave shape), it will greatly facilitate installation, thus allowing faster attaching, positioning, and removing of optical lens accessory 100.

The optical lens accessory of the present disclosure may be used in conjunction with a terminal device equipped with both a front camera device and a rear camera device, the optical lens accessory includes: an optical device comprised of two fisheye lenses arranged in a back-to-back configuration, where the directions of the two respective viewing angles associated with the two fisheye lenses are opposite to each other, and where the viewing angle of each of the fisheye lenses is greater than 180° to allow each of the two fisheye lenses to independently frame a view in the respective direction of the respective viewing angle, where the optical device is configured to let the framed lights into the two camera devices; a housing device positioned outside the optical device and causing no interference to the ranges of viewing angles of the two fisheye lenses, where the housing device is configured to support the optical device, and to isolate the framed lights from external stray light, thereby preventing the external stray light from interfering with the two optical paths of the two framed lights; and a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography. Given that the optical lens accessory is used in conjunction with a terminal device equipped with two camera devices, the optical lens accessory includes a fisheye lens, the fisheye lens is configured to frame a view with a range of viewing angle greater than 180 degrees and let framed light into the camera device. By this configuration, the present technology can rapidly and easily meet the needs for panoramic photography with the terminal device equipped with the camera device, thereby greatly reducing costs for users, and improving user experience.

In addition, to focus framed light that entered into the camera device 21 to an image by a spherical view angle, the camera device 21 may be configured to set one or more optical lenses in an optical path entering into the camera device 21.

Turning to FIG. 2, the optical device may further include two lenses 14 (14a and 14b). The two lenses 14 may be respectively positioned in two optical paths through which two framed lights 110 (110a and 110b) entering two camera devices 21 (21a and 21b), where the two lenses are configured to move back and forth along the axial directions thereof to adjust a respective distance between each of the two lenses and a respective camera device of the two camera devices so as to merge the two framed lights 110, thereby causing the two framed lights 110 to both entirely enter the two camera devices 21 (21a and 21b).

In some embodiments, the centers of two fisheye lenses 12 and the centers of two camera devices 21 may be on a same axis. That is, the center of fisheye lens 12a and the center of front (or rear) camera device 21 may be on a same axis. The center of fisheye lens 12b and the center of rear (or front) camera device 21 may be on a same axis.

When the center of front camera device 21 and rear camera device 21 (21a and 21b) is not on a same axis, the fisheye lens 12a and the fisheye lens 12b may not be on a same axis. When the center of front camera device 21 and rear camera device 21 (21a and 21b) is on a same axis, the fisheye lens 12a and the fisheye lens 12b may be on a same axis (as shown in FIG. 2), by this configuration, a more compact design of the optical lens accessory may be achieved.

A distance between two fisheye lenses 12 may be defined as a first distance. When the optical lens accessory 100 is attached to the adapted terminal device 200, the first distance is such that an area associated with a portion of the viewing-angle-covered field blocked by terminal device 200 is minimized.

A size of the housing device may be defined as a first size. When the optical lens accessory 100 is attached to the adapted terminal device 200, the first size is such that an area associated with a portion of the viewing-angle-covered field blocked by terminal device 200 is minimized.

The requirements as described above may be based on a consideration of the size of the terminal device 200, the location of the camera device 21, and the viewing angle of fisheye lenses 12. The distance between the housing device of the optical lens accessory 100 and two fisheye lenses 12 may satisfy another design rule: an area associated with a portion of the viewing-angle-covered field blocked by the terminal device may need to be minimized.

Referring to FIG. 2, the detailed description of the change of optical path is described as below.

Referring to FIG. 2, the framed lights 110a and 110b from the fisheye lenses 12 (12a and 12b) may be parallel to lights 140a and 140b that entered the fisheye lenses 12 externally. Then, the framed lights 110a and 110b containing image information captured by two fisheye lenses 12 may be emitted by lens 14a and 14b and then projected onto optical image sensor 2112 (2112a and 2112b) through camera lens 2111 (2111a and 2111b) of the camera device 21 of the terminal device 200.

Figure 3:
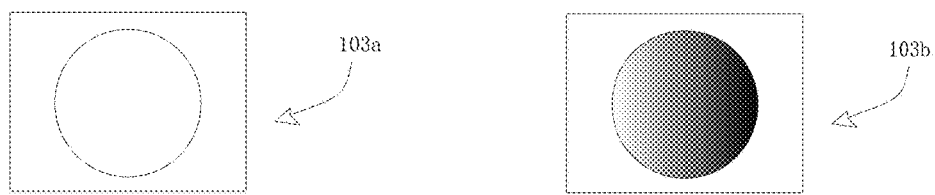
FIG. 3 is an exemplary image generated by an optical image sensor of the exemplary system shown in FIG. 2.

Referring to FIG. 3, two camera devices 21 (21a and 21b) may each produce an image frame containing a front image 103a and a rear image 103b, each of the front image 103a and rear image 103b may correspond to one of the two hemispheres, each of the two hemispheres may correspond to the range of viewing angle of two fisheye lenses 12. The image frames may be stitched to produce a panoramic image format.

A user may also adjust the position and distance between the lens 14 of the optical lens accessory 100 and the camera lens 2111 of the camera device 21 of the terminal device 200 so that the output image magnification of the optical image sensor 2112 of the camera device 21 can be effectively controlled.

If the terminal device 200 with image capturing capabilities contains one or more motion sensors such as a gyroscope and an accelerometer, data collected by the one or more motion sensors can effectively reduce one or more jitters resulting from the imaging capturing process.

In summary, the optical lens accessory of the present disclosure may have the following advantages:

(1) As compared with the prior art, the greatest advantage of the present disclosure may include simplifying one or more electronic circuits and components designs of the product. A simple adaptor comprising of the optical and structural modules may be a replacement, which has a low cost so that the users may capture one or more wide-angle images, spherical panoramic image with less cost and in a more convenient way.

(2) The scheme of the present disclosure may be universal. By changing the structure of housing and the number and position of the optical fisheye lenses, the optical lens accessory may be adapted in various circumstances.

(3) The present disclosure may have different applications and a promising market prospect.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. An optical lens accessory for panoramic photography, wherein the optical lens accessory is used in conjunction with a terminal device equipped with both a front camera device and a rear camera device, the optical lens accessory comprising:
   an optical device comprising a first fisheye lens and a second fisheye lens, wherein the first and second fisheye lenses are arranged in a back-to-back configuration, the first fisheye lens corresponds to the front camera device, the second fisheye lens corresponds to the back camera device, directions of two respective viewing angles associated with the two fisheye lenses are opposite to each other, and wherein the viewing angle of each of the fisheye lenses is greater than 180° to allow each of the two fisheye lenses to independently frame a view in the respective direction of the respective viewing angle, wherein the optical device is configured to let framed lights into the two camera devices, and wherein a center of the first fisheye lens and a center of the front camera device are on a same axis, and a center of the second fisheye lens and a center of the rear camera device are on a same axis;
   two lenses respectively positioned in two optical paths through which the two framed lights entering the two camera devices, wherein the two lenses are configured to move back and forth along axial directions thereof to adjust a respective distance between each of the two lenses and a respective camera device of the two camera devices so as to merge the two framed lights, thereby causing the two framed lights to both enter the two camera devices;
   a housing device positioned outside the optical device and causing no interference to ranges of viewing angles of the two fisheye lenses, wherein the housing device is configured to support the optical device, and to isolate the framed lights from external stray light, thereby preventing the external stray light from interfering with the two optical paths of the two framed lights; and
   a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography,
   wherein during a cooperative use of the optical lens accessory with the two camera devices, the two fisheye lenses are positioned on a front side and a rear side of the two camera devices, respectively.

2. The optical lens accessory according to claim 1, wherein centers of the two fisheye lenses and centers of the front and rear two camera devices are on a same axis.

3. The optical lens accessory according to claim 1, wherein a distance between the two fisheye lenses is defined as a first distance, wherein when the optical lens accessory is attached to the adapted terminal device, the first distance is such that an area associated with a portion of the viewing-angle-covered field blocked by the terminal device is minimized.

4. The optical lens accessory according to claim 1, wherein a size of the housing device is defined as a first size, wherein when the optical lens accessory is attached to the adapted terminal device, the first size is such that an area associated with a portion of the viewing-angle-covered field blocked by the terminal device is minimized.

5. An optical lens accessory for panoramic photography, wherein the optical lens accessory is used in conjunction with a terminal device equipped with both a front camera device and a rear camera device, the optical lens accessory comprising:
   an optical device comprised of two fisheye lenses arranged in a back-to-back configuration, wherein directions of two respective viewing angles associated with the two fisheye lenses are opposite to each other, and wherein the viewing angle of each of the fisheye lenses is greater than 180° to allow each of the two fisheye lenses to independently frame a view in the respective direction of the respective viewing angle, wherein the optical device is configured to let two framed lights into the two camera devices;
   a housing device positioned outside the optical device and causing no interference to ranges of viewing angles of the two fisheye lenses, wherein the housing device is configured to support the optical device, and to isolate the two framed lights from external stray light, thereby preventing the external stray light from interfering with the two optical paths of the two framed lights; and
   a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography,
   wherein during a cooperative use of the optical lens accessory with the two camera devices, the two fisheye lenses are positioned on a front side and a rear side of the two camera devices, respectively.

6. The optical lens accessory according to claim 5, wherein the optical devices further comprises:
   two lenses respectively positioned in two optical paths through which the two framed lights entering the two camera devices, wherein the two lenses are configured to move back and forth along axial directions thereof to adjust a respective distance between each of the two lenses and a respective camera device of the two camera devices so as to merge the two framed lights, thereby causing the two framed lights to both enter the two camera devices.

7. The optical lens accessory according to claim 5, wherein a center of one of the two fisheye lenses and a center of the front camera device are on a same axis, and a center of the other one of the two fisheye lenses and a center of the rear camera device are on a same axis, wherein the one of the two fisheye lens is positioned on the front side of the two camera devices, and the other one of the two fisheye lens is positioned on the rear side of the two camera devices.

8. The optical lens accessory according to claim 7, wherein centers of the two fisheye lenses and centers of the front and rear camera devices are on the same axis.

9. The optical lens accessory according to claim 5, wherein a distance between the two fisheye lenses is defined as a first distance, wherein when the optical lens accessory is attached to the adapted terminal device, the first distance is such that an area associated with a portion of the viewing-angle-covered field blocked by the terminal device is minimized.

10. The optical lens accessory according to claim 5, wherein a size of the housing device is defined as a first size, wherein when the optical lens accessory is attached to the adapted terminal device, the first size is such that an area associated with a portion of the viewing-angle-covered field blocked by the terminal device is minimized.

11. An apparatus comprising:
    a terminal device comprising two camera devices; and
    an optical lens accessory for panoramic photography engaged with the terminal device, and comprising:
      an optical device comprised of two fisheye lenses arranged in a back-to-back configuration, wherein directions of two respective viewing angles associated with the two fisheye lenses are opposite to each other, and wherein the viewing angle of each of the fisheye lenses is greater than 180° to allow each of the two fisheye lenses to independently frame a view in the respective direction of the respective viewing angle, wherein the optical device is configured to let two framed lights into the two camera devices;
      a housing device positioned outside the optical device and causing no interference to ranges of viewing angles of the two fisheye lenses, wherein the housing device is configured to support the optical device, and to isolate the two framed lights from external stray light, thereby preventing the external stray light from interfering with the two optical paths of the two framed lights; and
      a fixture device configured to attach the optical lens accessory to the terminal device while causing no interference to the ranges of viewing angles of the two fisheye lenses, thereby facilitating a cooperative use of the optical lens accessory with the two camera devices to perform wide angle-of-view photography,
    wherein during a cooperative use of the optical lens accessory with the two camera devices, the two fisheye lenses are positioned on a front side and a rear side of the two camera devices, respectively.

12. The apparatus according to claim 11, wherein the two camera devices comprises a front camera device and a rear camera device, centers of the two fisheye lenses and centers of the two camera devices are on a same axis.

13. The apparatus according to claim 11, wherein the optical devices further comprises:
    two lenses respectively positioned in two optical paths through which the two framed lights entering the two camera devices, wherein the two lenses are configured to move back and forth along axial directions thereof to adjust a respective distance between each of the two lenses and a respective camera device of the two camera devices so as to merge the two framed lights, thereby causing the two framed lights to both enter the two camera devices.

14. The apparatus according to claim 11, wherein each of the two camera devices comprises an optical capture module configured to process and record one or more wide-angle images, and an optical adaptation and image processing module configured to perform image stitching, and image post-processing by a computer software.

15. The apparatus according to claim 11, wherein a distance between the two fisheye lenses is defined as a first distance, wherein when the optical lens accessory is attached to the adapted terminal device, the first distance is such that an area associated with a portion of the viewing-angle-covered field blocked by the terminal device is minimized.

16. The apparatus according to claim 11, wherein a size of the housing device is defined as a first size, wherein when the optical lens accessory is attached to the adapted terminal device, the first size is such that an area associated with a portion of the viewing-angle-covered field blocked by the terminal device is minimized.

* * * * *